(12) United States Patent
Chen et al.

(10) Patent No.: US 7,567,444 B2
(45) Date of Patent: Jul. 28, 2009

(54) MULTI-OUTPUT DC-DC CONVERTER WITH IMPROVED CROSS-REGULATION PERFORMANCE

(75) Inventors: Wei Chen, Shanghai (CN); Zengyi Lu, Shanghai (CN); Gangming Qiu, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 358 days.

(21) Appl. No.: 11/537,400

(22) Filed: Sep. 29, 2006

(65) Prior Publication Data

US 2007/0247882 A1 Oct. 25, 2007

(30) Foreign Application Priority Data

Apr. 25, 2006 (TW) .............................. 95114754 A (51) Int. Cl.
*H02M 3/335* (2006.01)
(52) U.S. Cl. ..................................... 363/21.01; 363/95
(58) Field of Classification Search ................... 363/16, 363/17, 20, 21.01, 95, 97
See application file for complete search history.

(56) References Cited

U.S. PATENT DOCUMENTS

| | | | | |
|---|---|---|---|---|
| 3,745,440 A | * | 7/1973 | Lord | 363/17 |
| 5,313,481 A | * | 5/1994 | Cook et al. | 372/37 |
| 5,612,862 A | * | 3/1997 | Marusik et al. | 363/93 |
| 7,009,855 B2 | * | 3/2006 | Mueller | 363/24 |

* cited by examiner

*Primary Examiner*—Adolf Berhane (57) ABSTRACT

A multi-output DC-DC converter that can optimize its cross-regulation performance is proposed, in which a nonlinear inductive element functioning as a leakage inductance of an output coupled inductor is placed on the output channel of at least one secondary circuit coupled to a secondary winding of a transformer. The inductance of the nonlinear inductive element is varied in inverse proportion with the variation of the current flowing through the nonlinear inductive element. When the load on an output end of the DC-DC converter is changed, the output channel having a higher load current is configured to produce a lower leakage inductance and the output channel having a lower load current is configured to produce a higher leakage inductance, and thereby balance the output currents flowing through the output channels of the DC-DC converter.

16 Claims, 9 Drawing Sheets

MULTI-OUTPUT DC-DC CONVERTER WITH IMPROVED CROSS-REGULATION PERFORMANCE

FIELD OF THE INVENTION

The present invention is related to a multi-output DC-DC converter, and more particularly to a multi-output DC-DC converter for optimizing its cross-regulation performance.

BACKGROUND OF THE INVENTION

For the power supply used in a personal computer, the power supply is configured to provide a variety of output voltages to power various electronic products conformable to miscellaneous input voltage specification. Therefore, the switching power supply used in a personal computer generally can provide output voltages with different levels, for example, 5V or 12V, to power the peripheral devices located within the personal computer.

For a multi-output power supply, more particularly a multi-output DC-DC converter, the load to which the power supply is connected is not always stationary. When the load connected to an output terminal is changed, the output voltage of the other output terminal will be varied in response to the variation of the output current at the load-varying output terminal. In order to fix the deviation of the output voltage as result of the load change, cross-regulation is necessary to balance the output voltages between the multiple output terminals. Therefore, the static regulation performance of the converter will be an important consideration when it is desired to design a converter for providing two or more output voltages.

In a typical multi-output DC-DC converter, it is known that the major inductive elements of the converter, such as transformer and output inductors, and the conduction loss generated in the converter are the major contributors to the cross-regulation. Taking a two-output DC-DC converter as an example, when an output terminal is connected to a light load and the other output terminal is connected to a heavy load, the output current of the output terminal to which the light load is connected is prone easy to enter a discontinuous conduction mode (DCM). Under this condition, the cross-regulation performance of the converter would be deteriorated. Therefore, an efficient solution to improve the cross-regulation performance of a multi-output DC-DC converter is to reduce the output current ripple of the multi-output DC-DC converter, so that the outputs currents flowing in the output terminals can be mutually equal and thus the output current flowing in the output terminal to which the light load is connected is difficult to enter the discontinuous conduction mode.

Based on the foregoing concepts, the conventional cross-regulation technique is carried out by respectively placing an output inductor made up of a coupled inductor on each output channel in order to reduce the output current ripple, so that the output current to which the light load is connected is not prone to enter the discontinuous conduction mode. However, the leakage inductance of the output inductor placed on the output channel is not variable along with the load change. The past experimental statistics and theoretical analysis have proven that the smaller the leakage inductance of the output inductor at the output terminal to which a heavy load connected is and the lager the leakage inductance of the output inductor at the output terminal to which a light load connected is, the better the cross-regulation performance of the multi-output DC-DC converter can offer. Therefore, if it is desired to impose a strict requirement on the cross-regulation performance of a multi-output DC-DC converter, it would be unsatisfactory to simply rely on the coupled inductor at the output terminal of the multi-output DC-DC converter.

It should be clearly understood from the above statements that if the multi-output DC-DC converter is provided with inductive elements each of which is placed on an output channel of the multi-output DC-DC converter and functioning as a leakage inductance with an inductance being variable according to the change of the output current, the cross-regulation performance of the multi-output DC-DC converter can be significantly improved. The present invention can satisfy these needs.

SUMMARY OF THE INVENTION

An object of the present invention is to provide a multi-output DC-DC converter with an optimum cross-regulation performance.

Another object of the present invention is to provide a multi-output DC-DC converter being able to perform accurate cross-regulation in response to the change of load to which an output terminal of the multi-output DC-DC converter is connected.

According to a primitive idea of the present invention, a multi-output DC-DC converter is provided, including a switch, a transformer having a primary winding and a plurality of secondary windings, in which the primary winding is connected to the switch for receiving an input DC voltage and each secondary winding is configured to induce an AC voltage according to the on/off operations of the switch, and a plurality of secondary circuits each of which is connected to a secondary winding and configured to converter an AC voltage induced on the secondary winding connected therewith into a desired output voltage. At least one secondary circuit is provided with a nonlinear inductive element being placed on an output channel thereof, in which the inductance of the nonlinear inductive element is variable according to the change of the current flowing through the nonlinear inductive element. More specifically, the nonlinear inductive element is characterized in terms of the principle that its inductance is set to decrease along with the increase of the current flowing through the nonlinear inductive element.

Now the foregoing and other features and advantages of the present invention will be best understood through the following descriptions with reference to the accompanying drawings, wherein:

DETAILED DESCRIPTION OF THE PREFERRED EMBODIMENT

Figure 1:
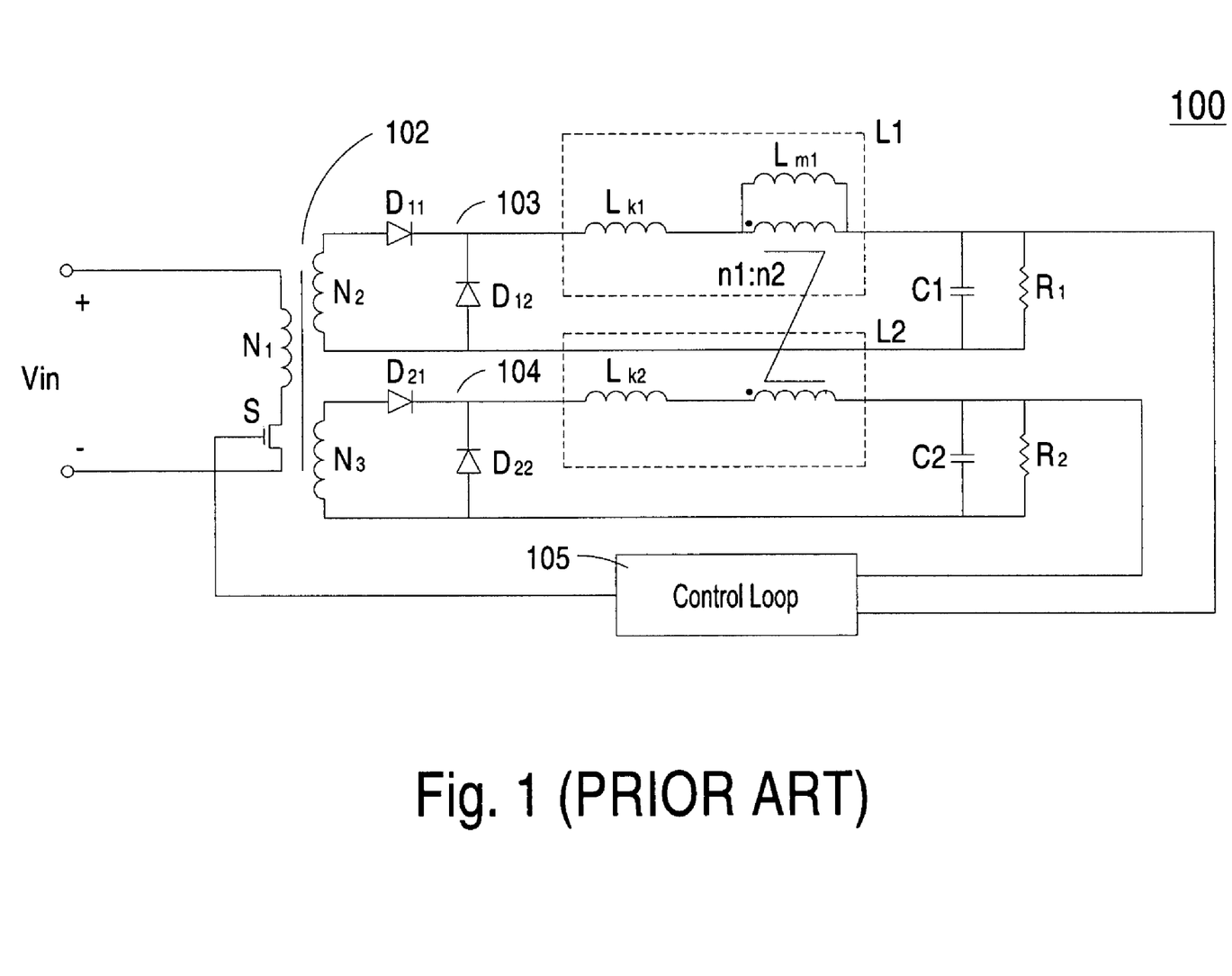
FIG. 1 shows the circuitry of a conventional multi-output DC-DC converter.

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative FIG. 1 shows the circuitry of a multi-output DC-DC converter according to the prior art. It should be noted that the same reference numeral represents the same circuit element throughout the specification. As shown in FIG. 1, a forward converter 100 includes a transformer 102 having a primary winding N1 and a plurality of secondary windings (N2, N3), a primary circuit, and a plurality of secondary circuits (103, 104), in which the primary circuit is made up of a switch S and a control loop 105. One end of the primary winding N1 is connected to the switch S, and the on/off operations of the switch S are manipulated by the control loop 105. The control loop 105 is configured to generate pulse signals based on the difference between an output voltage of the forward converter 100 and a reference voltage for regulating the duty cycle of the switch S. The transformer 102 functions as an energy transmission device for transmitting energy during each duty cycle and respectively inducing an AC voltage across each secondary winding (N2, N3).

A first secondary circuit 103 is located on the secondary side of the transformer 102. The first secondary circuit 103 is connected to the secondary winding N2, and includes a half-bridge rectifier made up of rectifying diodes (D11, D12) and an output filter made up of an output inductor L1 and a filtering capacitor C1. The AC voltage generated across the secondary winding N2 is rectified by the rectifying diodes (D11, D12) into a rectified DC voltage, which is then filtered by the output filter (L1, C1) to remove the high-frequency harmonic components thereof, and thereby obtaining a desired output voltage to be provided to a load (not shown).

Also, a second secondary circuit 104 is located on the secondary side of the transformer 102. The second secondary circuit 104 is connected to the secondary winding N3, and includes a half-bridge rectifier made up of rectifying diodes (D21, D22) and an output filter made up of an output inductor L2 and a filtering capacitor C2. The AC voltage generated across the secondary winding N3 is rectified by the rectifying diodes (D21, D22) into a rectified DC voltage, which is then filtered by the output filter (L2, C2) to remove the high-frequency harmonic components thereof, and thereby obtaining a desired output voltage to be provided to a load (not shown).

In FIG. 1, the output inductors L1 and L2 are both implemented by a coupled inductor in order to remove the ripple current flowing through the inductors and drive the output inductor to which a light load is connected to work in the continuous conduction mode (CCM). In FIG. 1, the output inductors are represented in terms of transformer models, in which the reference numerals Lk1 and Lk2 respectively denote the leakage inductance of the output inductor L1 and the leakage inductance of the output inductor L2, and the reference numeral Lm1 denotes the magnetizing inductance of the output inductors L1 and L2.

Nonetheless, the configuration constituted by implementing the output inductor with a coupled inductor in a multi-output DC-DC converter according to the prior art can offer a limited cross-regulation performance. If it is desired to efficiently improve the cross-regulation performance of a multi-output DC-DC converter, the multi-output DC-DC converter has to allow the leakage inductance of the transformer 102 or the output inductors L1 and L2 to be variable in response to the change of the load current at the output terminals, so that the cross-regulation performance of the multi-output DC-DC converter can be optimized.

Figure 2A:
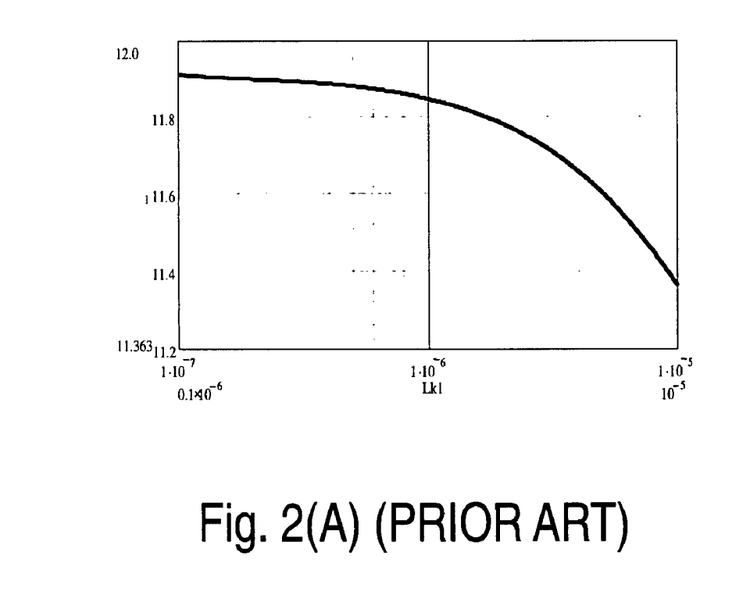
FIG. 2(A) to 2(D) shows the characteristic curves of the output voltage versus the leakage inductance of the output inductor within the conventional multi-output DC-DC converter of FIG. 1.
Figure 2B:
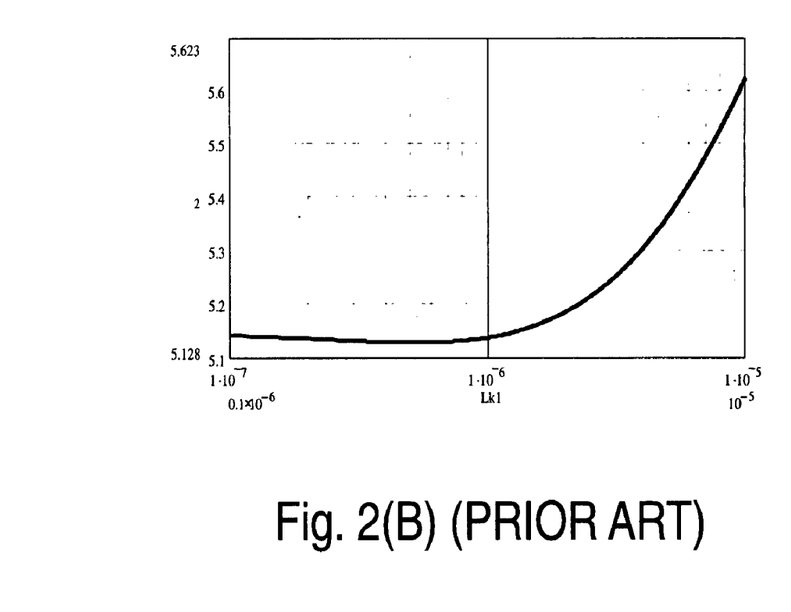
Figure 2C:
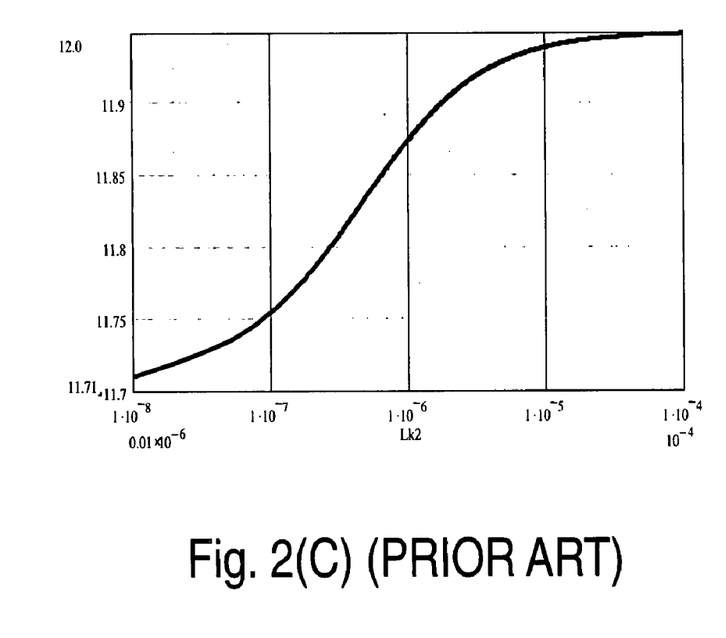
Figure 2D:
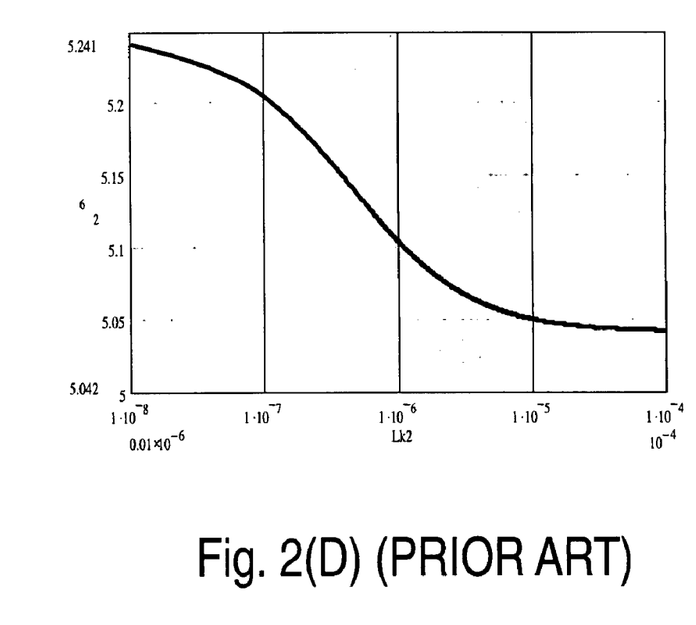

Assuming that the output voltage of the first secondary circuit 103 is 12V and the load to which it is connected is a heavy load and the output inductor L1 is working in continuous conduction mode. Further, assuming that the output voltage of the second secondary circuit 104 is 5V and the load to which it is connected is a light load and the output inductor L2 is working in discontinuous conduction mode. FIG. 2(A) shows the characteristic curve of the output voltage of the first secondary circuit 103 versus the leakage inductance Lk1 of the output inductor L1. FIG. 2(B) shows the characteristic curve of the output voltage of the second secondary circuit 104 versus the leakage inductance Lk1 of the output inductor L1. FIG. 2(C) shows the characteristic curve of the output voltage of the first secondary circuit 103 versus the leakage inductance Lk2 of the output inductor L2. FIG. 2(D) shows the characteristic curve of the output voltage of the second secondary circuit 104 versus the leakage inductance Lk2 of the output inductor L2. It can be known from the characteristic curve of FIG. 2(A) that the smaller the leakage inductance Lk1 of the output inductor L1 is, the closer the output voltage of the first secondary circuit 103 advances to 12V. Also, it can be known from the characteristic curve of FIG. 2(B) that the smaller the leakage inductance Lk1 of the output inductor L1 is, the closer the output voltage of the second secondary circuit 104 approaches to 5V. That is to say, the smaller the leakage inductance of the output inductor L1 is, the better the cross-regulation performance of the multi-output DC-DC converter 100 can offer. Besides, it can be known from the characteristic curve of FIG. 2(C) that the larger the leakage inductance Lk2 of the output inductor L2 is, the closer the output voltage of the first secondary circuit 103 advances to 12V. Also, it can be known from the characteristic curve of FIG. 2(D) that the larger the leakage inductance Lk2 of the output inductor L2 is, the closer the output voltage of the second secondary circuit 104 advances to 5V. That is to say, the larger the leakage inductance of the output inductor L2 is, the better the cross-regulation performance of the multi-output DC-DC converter 100 can offer.

Based on the foregoing theory, it can be known that if it is desired to improve the cross-regulation performance of a multi-output DC-DC converter, the leakage inductance of the output inductor to which a heavy load is connected has to decrease and the leakage inductance of the output inductor to which a light load is connected has to increase, so that the deviation of the output voltage caused by the load change can be obviated.

Figure 3:
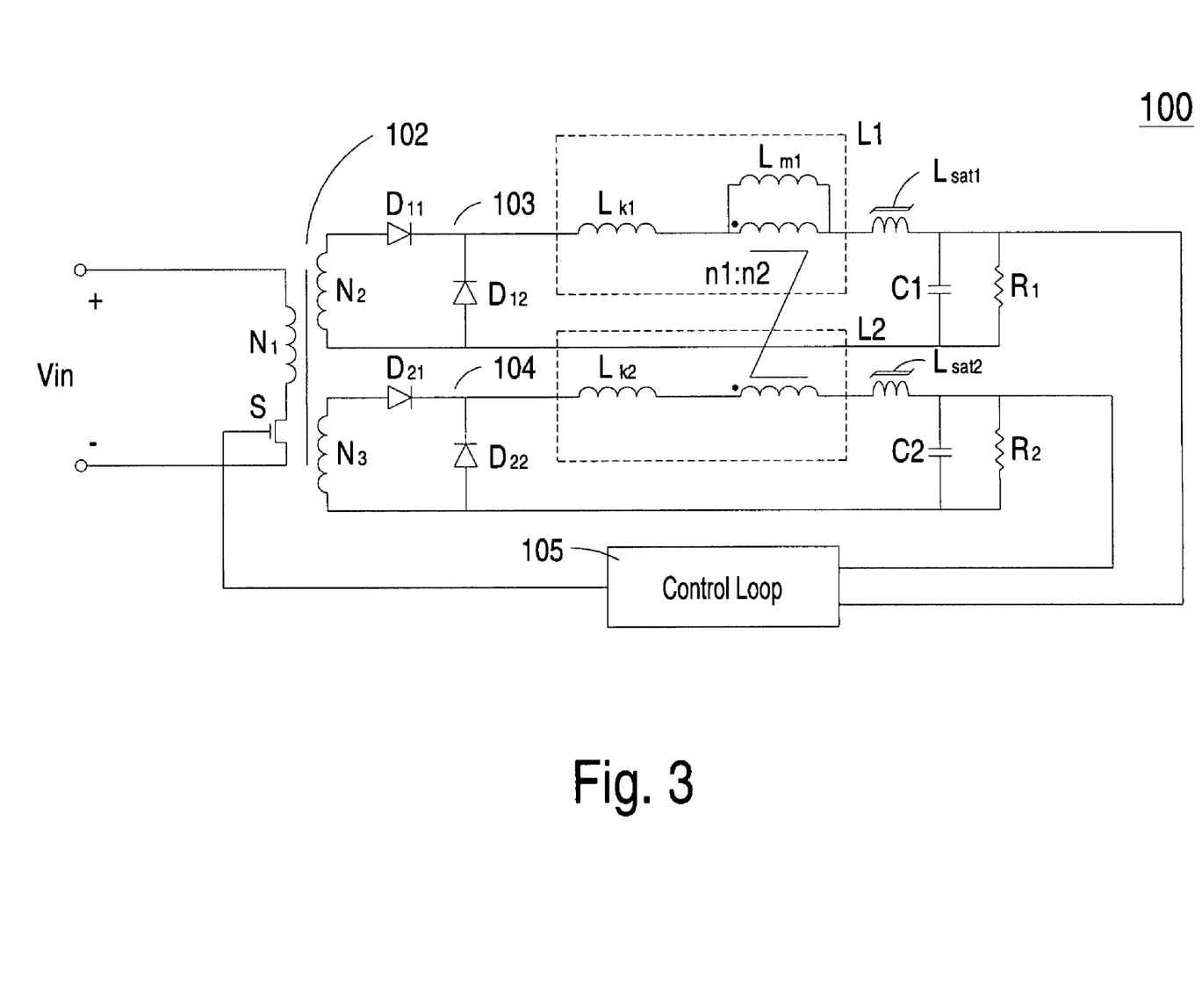
FIG. 3 shows the circuitry of a multi-output DC-DC converter according to a first preferred embodiment of the present invention.

FIG. 3 is a circuit diagram of a multi-output DC-DC converter 100 according to a first preferred embodiment of the present invention. As shown in FIG. 3, non-linear inductors (Lsat1, Lsat2) are respectively placed on the output channel of the secondary circuits (103, 104) and respectively connected in series with an output inductor (L1, L2). The nonlinear inductors (Lsat1, Lsat2) are both implemented with a saturated inductor.

Figure 4:
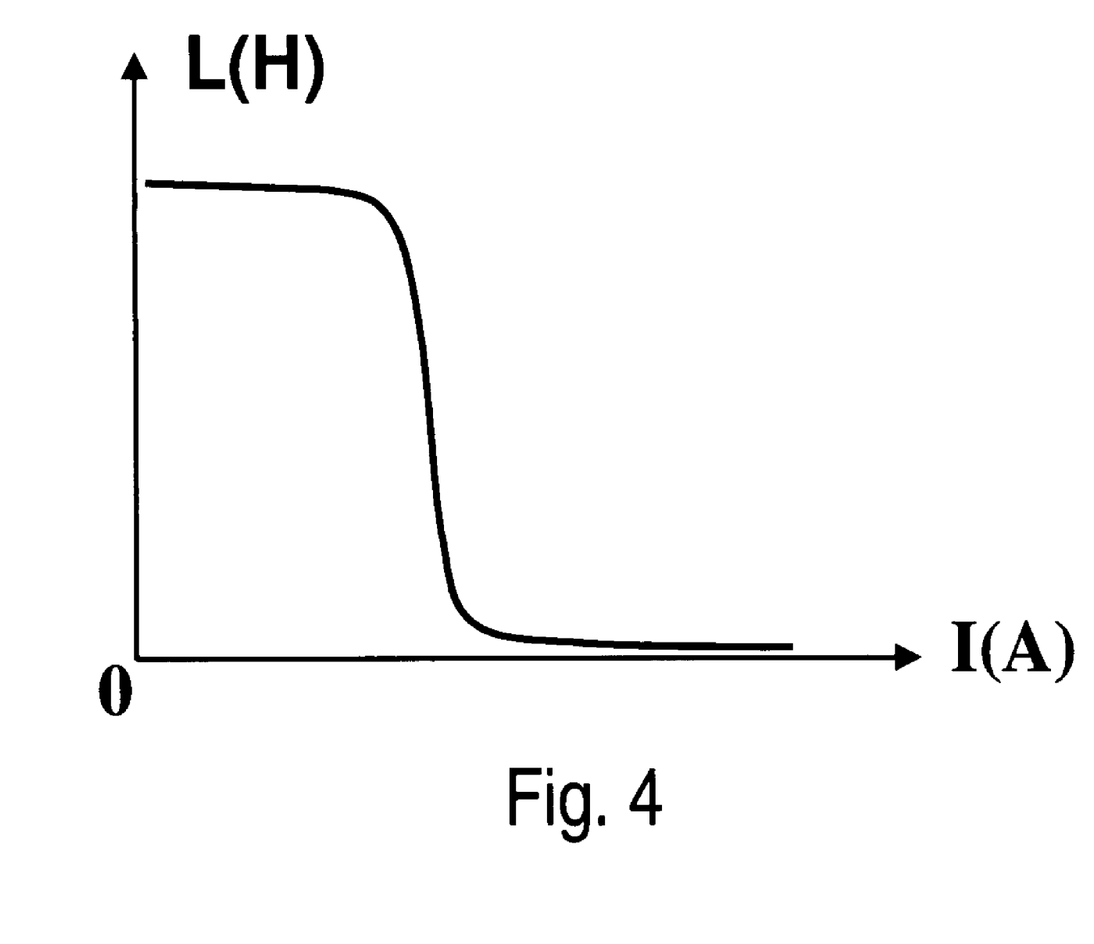
FIG. 4 shows the characteristic curve of the inductance versus the current of the nonlinear inductive elements Lsat1, Lsat2 under the DC mode.

It is noteworthy that the nonlinear inductors (Lsat1, Lsat2) both have a variable inductance-current characteristic. FIG. 4 shows the inductance-current characteristic curve of the nonlinear inductors (Lsat1, Lsat2) under the DC mode. As can be seen from FIG. 4, the variation on the inductance of the nonlinear inductors (Lsat1, Lsat2) is in inverse proportion to the change of the current flowing through the nonlinear inductors (Lsat1, Lsat2). In other words, when the current flowing through the nonlinear inductors (Lsat1, Lsat2) increases, the inductance of the nonlinear inductors (Lsat1, Lsat2) decreases. Likewise, when the current flowing through the nonlinear inductors (Lsat1, Lsat2) decreases, the inductance of the nonlinear inductors (Lsat1, Lsat2) increases. Therefore, when the load to which the first secondary circuit 103 is connected is a heavy load, that is, the current flowing through the nonlinear inductor Lsat1 is large, the inductance of the nonlinear inductor Lsat1 will be small (which means that the leakage inductance of the output inductor L1 will be small). In the meantime, the load to which the second secondary circuit 104 is connected is a light load, that is, the current flowing through the nonlinear inductor Lsat2 is small, the inductance of the nonlinear inductor Lsat1 will be large (which means that the leakage inductance of the output inductor L2 will be large). Therefore, the leakage inductance of the output inductor can be variable according to the change of the output currents of the multi-output DC-DC converter, so that the output current of the second secondary circuit 104 to which the light load is connected will not be prone to enter the discontinuous conduction mode, and thereby improving the cross-regulation performance of the multi-output DC-DC converter 100.

Figure 5:
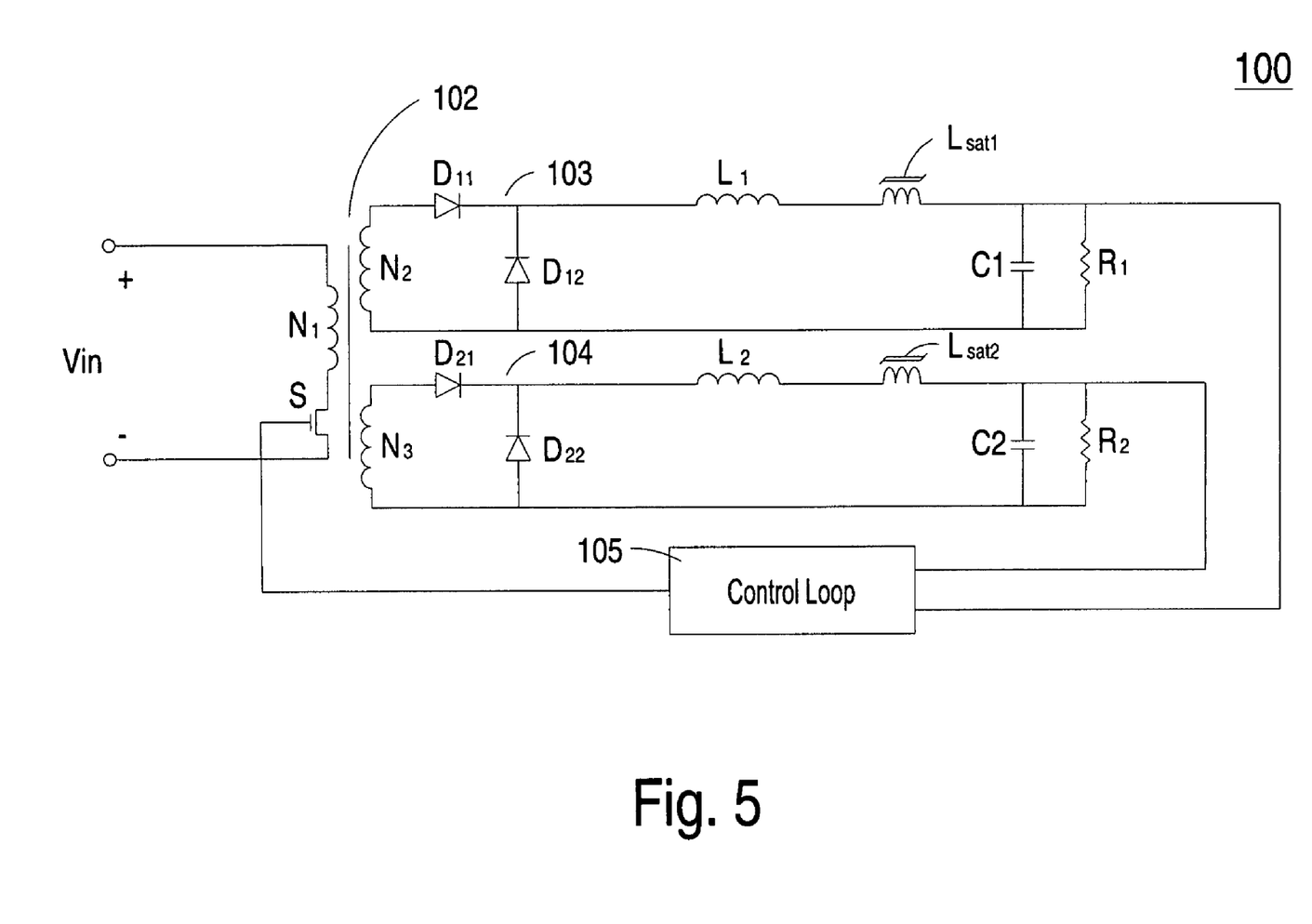
FIG. 5 shows the circuitry of a multi-output DC-DC converter according to a second preferred embodiment of the present invention.
Figure 6:
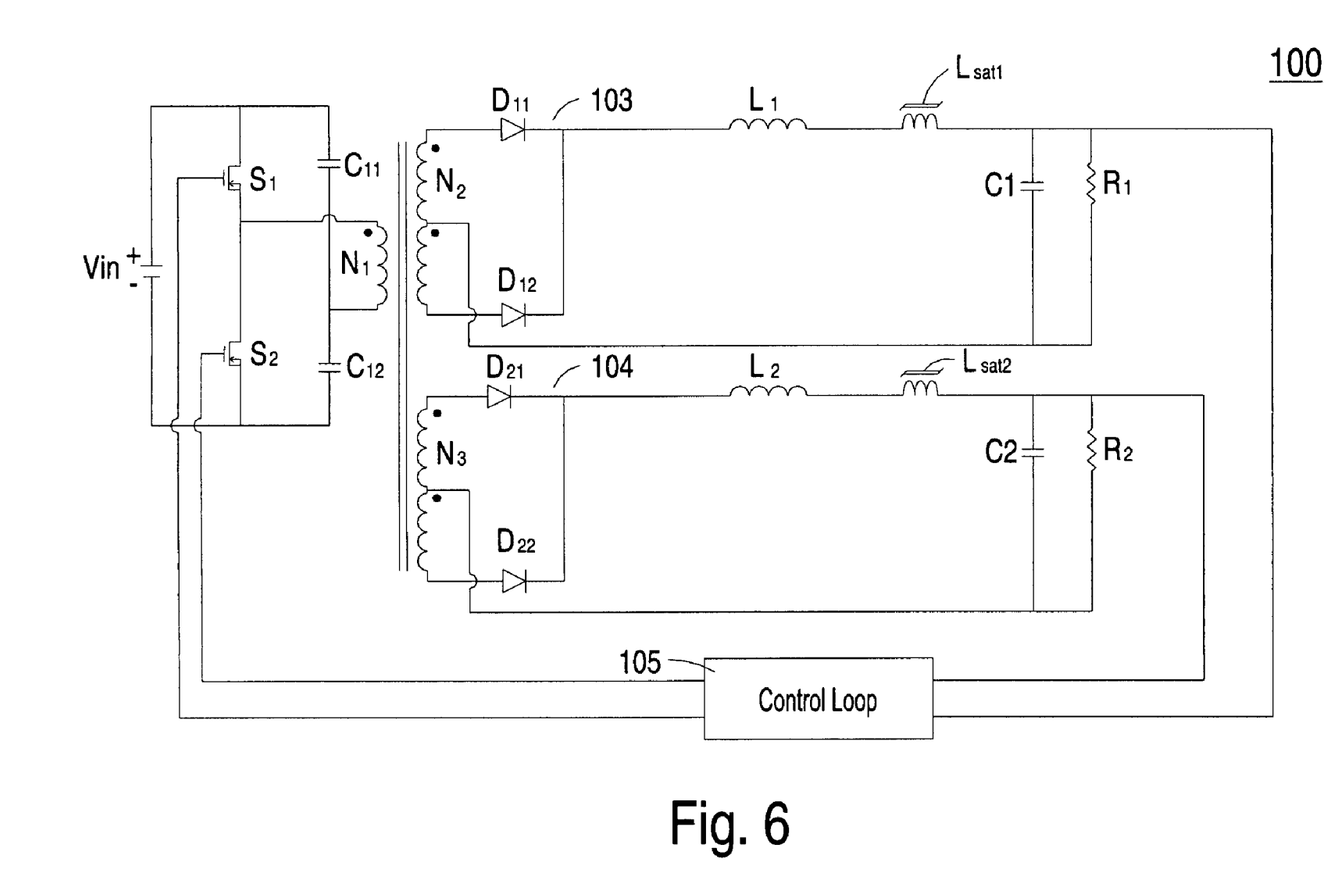
FIG. 6 shows the circuitry of a multi-output DC-DC converter according to a third prefeffed embodiment of the present invention.
Figure 7:
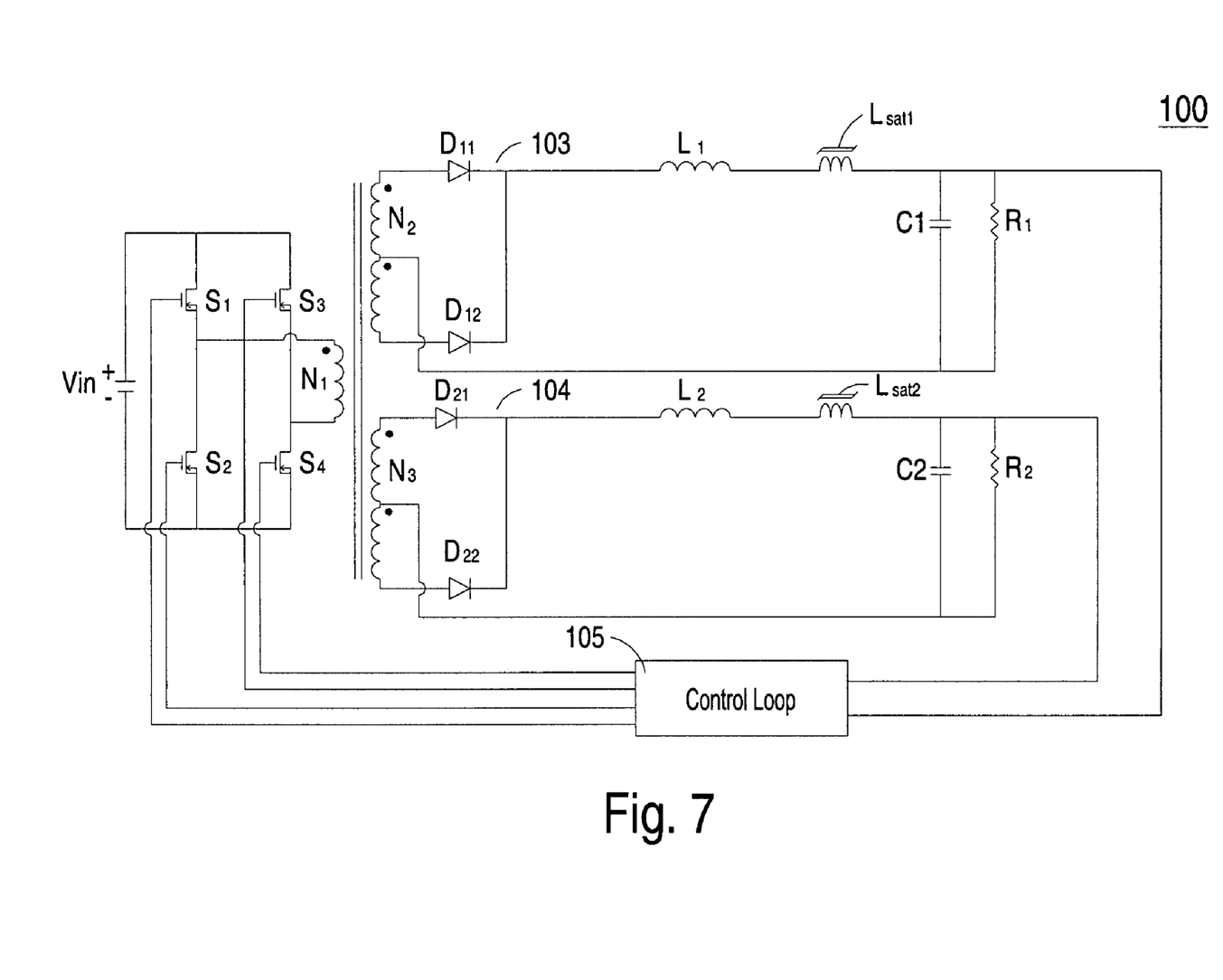
FIG. 7 shows the circuitry of a multi-output DC-DC converter according to a fourth prefeffed embodiment of the present invention.
Figure 8:
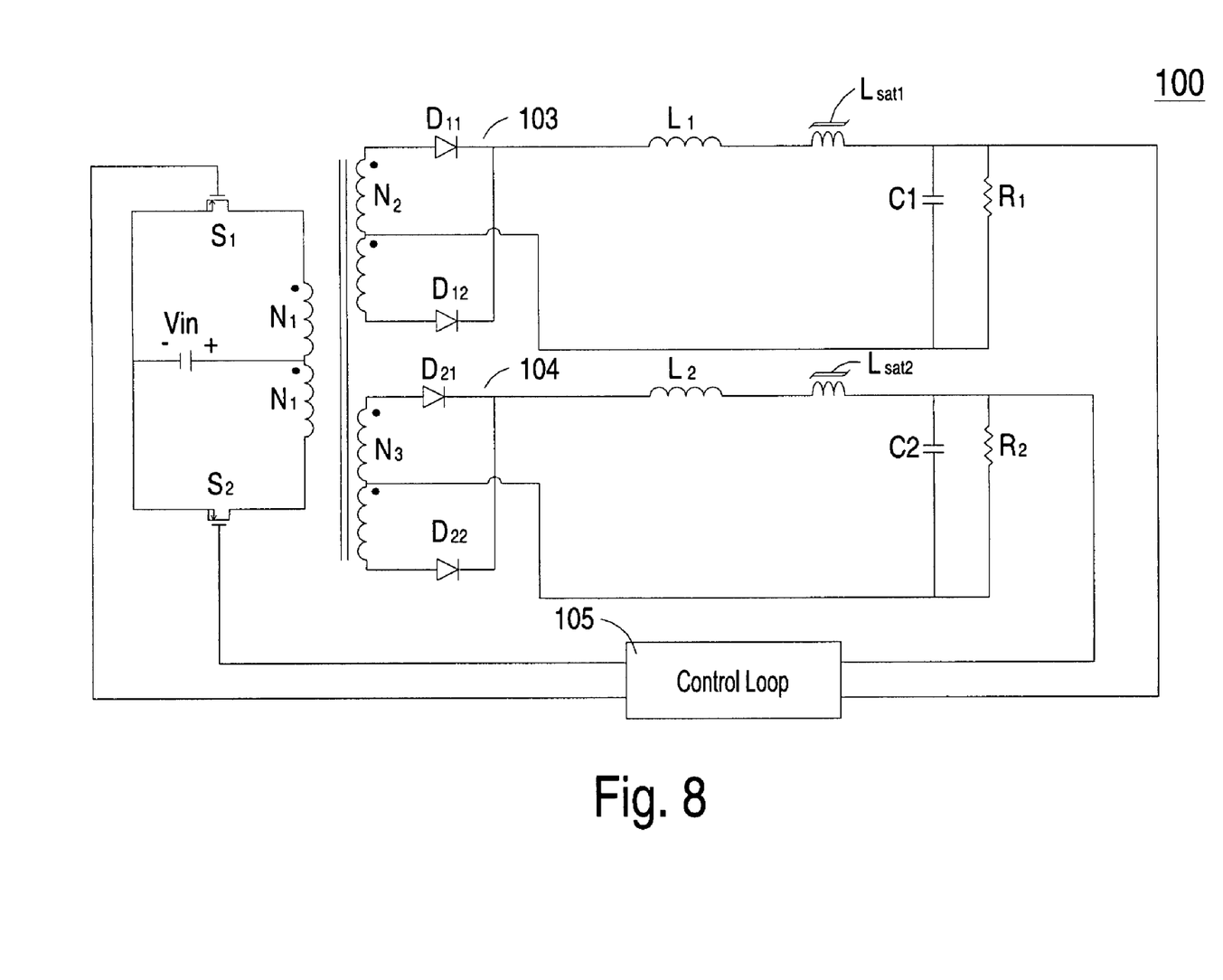
FIG. 8 shows the circuitry of a multi-output DC-DC converter according to a fifth prefeffed embodiment of the present invention.

It is also noteworthy that the output inductors Li and L2 are not limited to be implemented with coupled inductors. FIG. 5 shows a circuit diagram of a multi-output DC-DC converter 100 according to a second preferred embodiment of the present invention, in which the output inductors L1 and L2 are both implemented with uncoupled inductor. Furthermore, it is to be noted that the examples of FIG. 3 and FIG. 5 adopt a forward converter topology to illustrate the theorem of cross-regulation improvement in a multi-output DC-DC converter, other DC-DC converter topology, for example, a half-bridge DC-DC converter as shown in FIG. 6, a full-bridge DC-DC converter as shown in FIG. 7 or a push-pull DC-DC converter as shown in FIG. 8, can be employed to apply the inventive cross-regulation technique to improve its cross-regulation performance. Alternatively, the nonlinear inductor Lsatl can also be connected in series between the rectifying circuit (D11, D12) and the output filter (L1, C1), and the nonlinear inductor Lsat2 can also be connected in series between the rectifying circuit (D21, D22) and the output filter (L2, C2).

In summary, the cross-regulation regulation technique for improving the cross-regulation performance of a multi-output DC-DC converter as set forth in the present invention is based on the theorem that each secondary circuit of a multi-output DC-DC converter incorporates a nonlinear inductive element on an output channel thereof. The nonlinear inductive elements are characterized by allowing their inductance to be variable according to the currents flowing therethrough. Therefore, when the load to which an output terminal of the multi-output DC-DC converter is connected is changed, the inductance of the nonlinear inductive element at the load-varying output terminal can be varied in response to the change of the output current, which means that the leakage inductance of the output inductor at the load-varying output terminal can be varied in response to the change of the output current. In this manner, the cross-regulation performance of the multi-output DC-DC converter can be regulated according to the load change, and thereby obtaining an optimum cross-regulation performance for the multi-output DC-DC converter.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A multi-output DC-DC converter, comprising
a switch;
a transformer having a primary winding and a plurality of secondary windings, wherein the primary winding is coupled to the switch and configured to receive an input DC voltage and respectively induce an AC voltage across each secondary winding according to on/off operations of the switch; and
a plurality of secondary circuits, each of which is connected to a secondary winding and configured to convert the AC voltage induced across a secondary winding connected therewith into a desired output voltage;
wherein at least one secondary circuit incorporates at least one nonlinear inductive on an output channel thereof, and wherein the inductance of the nonlinear inductive element is variable according to the current flowing through the nonlinear inductive element.

2. The multi-output DC-DC converter according to claim 1 wherein the nonlinear inductive element is characterized by allowing its inductance to decrease along with the increase of the current flowing through the nonlinear inductive element.

3. The multi-output DC-DC converter according to claim 1 wherein each secondary circuit comprises:
a rectifying circuit coupled to a secondary winding and configured to rectify the AC voltage induced across a secondary winding coupled therewith into a rectified DC voltage; and
an output filter coupled to the rectifying circuit and configured to filter the rectified DC voltage into a desired output voltage.

4. The multi-output DC-DC converter according to claim 3 wherein the rectifying circuit includes two half-bridge rectifying diodes.

5. The multi-output DC-DC converter according to claim 3 wherein the output filter includes an output inductor and a filtering capacitor.

6. The multi-output DC-DC converter according to claim 5 wherein the output inductor is connected in series with the nonlinear inductive element.

7. The multi-output DC-DC converter according to claim 3 wherein the multi-output DC-DC converter is configured as a forward converter, a half-bridge DC-DC converter, a full-bridge DC-DC converter, or a push-pull DC-DC converter.

8. A multi-output DC-DC converter comprising:
a primary circuit configured to provide a switching signal;
a transformer having a primary winding and a plurality of secondary windings, wherein the primary winding is configured to receive an input DC voltage and respectively induce an AC voltage across each secondary winding according to the switching signal; and a plurality of secondary circuits, each of which is connected to a secondary winding and configured to convert the AC voltage induced across a secondary winding connected therewith into a desired output voltage;

wherein at least one secondary circuit incorporates at least one nonlinear inductive element on an output channel thereof, and wherein the change of the inductance of the nonlinear inductive element is in inverse proportion to the change of the current flowing through the nonlinear inductive element.

9. The multi-output DC-DC converter according to claim 8 wherein the primary circuit comprises:

a switch connected to one end of the primary winding for providing the switching signal; and a control loop connected to the switch for generating pulse signals to control on/off operations of the switch.

10. The multi-output DC-DC converter according to claim 8 wherein each secondary circuit comprises:

a rectifying circuit coupled to a secondary winding and configured to rectify the AC voltage induced across a secondary winding coupled therewith into a rectified DC voltage; and an output filter coupled to the rectifying circuit and configured to filter the rectified DC voltage into a desired output voltage.

11. The multi-output DC-DC converter according to claim 10 wherein the nonlinear inductive element is connected in series with the rectifying circuit and the output filter.

12. The multi-output DC-DC converter according to claim 11 wherein the nonlinear inductive element is connected in series between the rectifying circuit and the output filter.

13. The multi-output DC-DC converter according to claim 10 wherein the rectifying circuit includes two half-bridge rectifying diodes.

14. The multi-output DC-DC converter according to claim 10 wherein the output filter includes an output inductor and a filtering capacitor.

15. The multi-output DC-DC converter according to claim 14 wherein the nonlinear inductive element is connected in series with the output inductor.

16. The multi-output DC-DC converter according to claim 8 wherein the multi-output DC-DC converter is configured as a forward converter, a half-bridge DC-DC converter, a full-bridge DC-DC converter, or a push-pull DC-DC converter.

* * * * *